US012730694B2

(12) United States Patent
Sauls et al.

(10) Patent No.: US 12,730,694 B2
(45) Date of Patent: Sep. 8, 2026

(54) VISUAL COMPONENTS IN A DATA-AGNOSTIC DASHBOARD RUNTIME ENVIRONMENT

(71) Applicant: Salesforce, Inc., San Francisco, CA (US)

(72) Inventors: Skip Sauls, San Francisco, CA (US); Medha Srivastava, San Francisco, CA (US); Edward Mengel, San Francisco, CA (US); Sameer Sethi, San Francisco, CA (US); James Diefenderfer, San Francisco, CA (US)

(73) Assignee: Salesforce, Inc., San Francisco, CA (US)

(*) Notice: Subject to any disclaimer, the term of this patent is extended or adjusted under 35 U.S.C. 154(b) by 0 days.

(21) Appl. No.: 18/391,634

(22) Filed: Dec. 20, 2023

(65) Prior Publication Data

US 2024/0126621 A1 Apr. 18, 2024

Related U.S. Application Data

(63) Continuation of application No. 17/400,062, filed on Aug. 11, 2021, now abandoned.

(51) Int. Cl.
*G06F 8/34* (2018.01)
*G06F 9/54* (2006.01)
(Continued)

(52) U.S. Cl.
CPC ................ *G06F 9/545* (2013.01); *G06F 8/34* (2013.01); *G06F 9/542* (2013.01);
(Continued)

(58) Field of Classification Search
CPC .. G06F 16/2452; G06F 16/958; G06F 16/901; G06F 16/2455; G06F 3/04845;
(Continued)

(56) References Cited

U.S. PATENT DOCUMENTS 5,577,188 A 11/1996 Zhu
5,608,872 A 3/1997 Schwartz et al.
(Continued)

OTHER PUBLICATIONS

Lim Ju Ho, KR 20170124187 (translation), Nov. 10, 2017, 7pgs <KR_20170124187.pdf>.*
(Continued)

*Primary Examiner* — Tuan A Vu
(74) *Attorney, Agent, or Firm* — Morgan, Lewis & Bockius LLP

(57) ABSTRACT

A dashboard runtime component includes (1) a visualization component configured to render a visual representation of data items retrieved from a data source and (2) a query execution component associated with at least the visualization component. The query execution component is configured to retrieve the data items from the data source. The dashboard runtime component also includes an application data interface configured to provide communication between the visualization component and the query execution component, including: (i) receiving notification of user interaction with the visualization component; (ii) passing a message to the query execution component, the message including instructions to execute an updated query according to the user interaction; (iii) receiving, from the query execution component, a dataset retrieved from the data source according to execution of the updated query; and (iv) passing the dataset to the visualization component, causing the visualization component to render an updated visual representation.

20 Claims, 6 Drawing Sheets

(51) Int. Cl.
*G06F 16/242* (2019.01)
*G06F 16/2452* (2019.01)
*G06F 16/26* (2019.01)
*G06Q 40/02* (2023.01)
*G06F 3/04817* (2022.01)
*G06N 20/00* (2019.01)

(52) U.S. Cl.
CPC ...... *G06F 16/2448* (2019.01); *G06F 16/2452* (2019.01); *G06F 16/26* (2019.01); *G06Q 40/02* (2013.01); *G06F 3/04817* (2013.01); *G06N 20/00* (2019.01)

(58) Field of Classification Search
CPC ...... G06F 3/04817; G06F 9/542; G06F 9/545; G07C 13/00; H04L 12/185; H04L 63/104
See application file for complete search history.

(56) References Cited

U.S. PATENT DOCUMENTS 5,649,104 A 7/1997 Carleton et al.
5,715,450 A 2/1998 Ambrose et al.
5,761,419 A 6/1998 Schwartz et al.
5,819,038 A 10/1998 Carleton et al.
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
5,983,227 A 11/1999 Nazem et al.
6,092,083 A 7/2000 Brodersen et al.
6,161,149 A 12/2000 Achacoso et al.
6,169,534 B1 1/2001 Raffel et al.
6,178,425 B1 1/2001 Brodersen et al.
6,189,011 B1 2/2001 Lim et al.
6,216,133 B1 4/2001 Masthoff
6,216,135 B1 4/2001 Brodersen et al.
6,233,617 B1 5/2001 Rothwein et al.
6,236,978 B1 5/2001 Tuzhilin
6,266,669 B1 7/2001 Brodersen et al.
6,288,717 B1 9/2001 Dunkle
6,295,530 B1 9/2001 Ritchie et al.
6,324,568 B1 11/2001 Diec et al.
6,324,693 B1 11/2001 Brodersen et al.
6,336,137 B1 1/2002 Lee et al.
D454,139 S 3/2002 Feldcamp et al.
6,367,077 B1 4/2002 Brodersen et al.
6,393,605 B1 5/2002 Loomans
6,405,220 B1 6/2002 Brodersen et al.
6,411,949 B1 6/2002 Schaffer
6,434,550 B1 8/2002 Warner et al.
6,446,089 B1 9/2002 Brodersen et al.
6,535,909 B1 3/2003 Rust
6,549,908 B1 4/2003 Loomans
6,553,563 B2 4/2003 Ambrose et al.
6,560,461 B1 5/2003 Fomukong et al.
6,574,635 B2 6/2003 Stauber et al.
6,577,726 B1 6/2003 Huang et al.
6,601,087 B1 7/2003 Zhu et al.
6,604,117 B2 8/2003 Lim et al.
6,604,128 B2 8/2003 Diec et al.
6,609,150 B2 8/2003 Lee et al.
6,621,834 B1 9/2003 Scherpbier et al.
6,654,032 B1 11/2003 Zhu et al.
6,665,648 B2 12/2003 Brodersen et al.
6,665,655 B1 12/2003 Warner et al.
6,684,438 B2 2/2004 Brodersen et al.
6,711,565 B1 3/2004 Subramaniam et al.
6,724,399 B1 4/2004 Katchour et al.
6,728,702 B1 4/2004 Subramaniam et al.
6,728,960 B1 4/2004 Loomans et al.
6,732,095 B1 5/2004 Warshaysky et al.
6,732,100 B1 5/2004 Brodersen et al.
6,732,111 B2 5/2004 Brodersen et al.
6,754,681 B2 6/2004 Brodersen et al.
6,763,351 B1 7/2004 Subramaniam et al.
6,763,501 B1 7/2004 Zhu et al.
6,768,904 B2 7/2004 Kim
6,772,229 B1 8/2004 Achacoso et al.
6,782,383 B2 8/2004 Subramaniam et al.
6,804,330 B1 10/2004 Jones et al.
6,826,565 B2 11/2004 Ritchie et al.
6,826,582 B1 11/2004 Chatterjee et al.
6,826,745 B2 11/2004 Coker
6,829,655 B1 12/2004 Huang et al.
6,842,748 B1 1/2005 Warner et al.
6,850,895 B2 2/2005 Brodersen et al.
6,850,949 B2 2/2005 Warner et al.
6,907,566 B1 6/2005 McElfresh et al.
7,062,502 B1 6/2006 Kesler
7,069,231 B1 6/2006 Cinarkaya
7,069,497 B1 6/2006 Desai
7,100,111 B2 8/2006 McElfresh et al.
7,181,758 B1 2/2007 Chan
7,269,590 B2 9/2007 Hull et al.
7,289,976 B2 10/2007 Kihneman et al.
7,340,411 B2 3/2008 Cook
7,356,482 B2 4/2008 Frankland et al.
7,373,599 B2 5/2008 McElfresh et al.
7,401,094 B1 7/2008 Kesler
7,406,501 B2 7/2008 Szeto et al.
7,412,455 B2 8/2008 Dillon
7,454,509 B2 11/2008 Boulter et al.
7,508,789 B2 3/2009 Chan
7,599,935 B2 10/2009 La Rotonda et al.
7,603,331 B2 10/2009 Tuzhilin et al.
7,603,483 B2 10/2009 Psounis et al.
7,620,655 B2 11/2009 Larsson et al.
7,644,122 B2 1/2010 Weyer et al.
7,668,861 B2 2/2010 Steven
7,698,160 B2 4/2010 Beaven et al.
7,730,478 B2 6/2010 Weissman
7,747,648 B1 6/2010 Kraft et al.
7,779,039 B2 8/2010 Weissman et al.
7,779,475 B2 8/2010 Jakobson et al.
7,827,208 B2 11/2010 Bosworth et al.
7,853,881 B1 12/2010 Aly Assal et al.
7,945,653 B2 5/2011 Zukerberg et al.
8,005,896 B2 8/2011 Cheah
8,014,943 B2 9/2011 Jakobson
8,015,495 B2 9/2011 Achacoso et al.
8,032,297 B2 10/2011 Jakobson
8,073,850 B1 12/2011 Hubbard et al.
8,082,301 B2 12/2011 Ahlgren et al.
8,095,413 B1 1/2012 Beaven
8,095,531 B2 1/2012 Weissman et al.
8,095,594 B2 1/2012 Beaven et al.
8,103,611 B2 1/2012 Tuzhilin et al.
8,150,913 B2 4/2012 Cheah
8,209,308 B2 6/2012 Rueben et al.
8,209,333 B2 6/2012 Hubbard et al.
8,275,836 B2 9/2012 Beaven et al.
8,457,545 B2 6/2013 Chan
8,484,111 B2 7/2013 Frankland et al.
8,490,025 B2 7/2013 Jakobson et al.
8,504,945 B2 8/2013 Jakobson et al.
8,510,045 B2 8/2013 Rueben et al.
8,510,664 B2 8/2013 Rueben et al.
8,566,301 B2 10/2013 Rueben et al.
8,646,103 B2 2/2014 Jakobson et al.
D782,506 S 3/2017 Mengel, III
D784,409 S 4/2017 Mengel, III
D798,326 S 9/2017 Kim
D809,556 S 2/2018 Mengel, III
10,360,136 B2 7/2019 Zheng
10,802,673 B2 10/2020 Mengel, III
10,852,926 B2 12/2020 Zheng
11,054,971 B2 7/2021 Zheng
2001/0044791 A1 11/2001 Richter et al.
2002/0072951 A1 6/2002 Lee et al.
2002/0082892 A1 6/2002 Raffel et al.
2002/0129352 A1 9/2002 Brodersen et al.
2002/0140731 A1 10/2002 Subramaniam et al.

(56) References Cited

U.S. PATENT DOCUMENTS

2002/0143997 A1 10/2002 Huang et al.
2002/0162090 A1 10/2002 Parnell et al.
2002/0165742 A1 11/2002 Robbins
2003/0004971 A1 1/2003 Gong
2003/0018705 A1 1/2003 Chen et al.
2003/0018830 A1 1/2003 Chen et al.
2003/0066031 A1 4/2003 Laane et al.
2003/0066032 A1 4/2003 Ramachandran et al.
2003/0069936 A1 4/2003 Warner et al.
2003/0070000 A1 4/2003 Coker et al.
2003/0070004 A1 4/2003 Mukundan et al.
2003/0070005 A1 4/2003 Mukundan et al.
2003/0074418 A1 4/2003 Coker et al.
2003/0120675 A1 6/2003 Stauber et al.
2003/0151633 A1 8/2003 George et al.
2003/0159136 A1 8/2003 Huang et al.
2003/0187921 A1 10/2003 Diec et al.
2003/0189600 A1 10/2003 Gune et al.
2003/0204427 A1 10/2003 Gune et al.
2003/0206192 A1 11/2003 Chen et al.
2003/0225730 A1 12/2003 Warner et al.
2004/0001092 A1 1/2004 Rothwein et al.
2004/0010489 A1 1/2004 Rio et al.
2004/0015981 A1 1/2004 Coker et al.
2004/0027388 A1 2/2004 Berg et al.
2004/0128001 A1 7/2004 Levin et al.
2004/0186860 A1 9/2004 Lee et al.
2004/0193510 A1 9/2004 Catahan et al.
2004/0199489 A1 10/2004 Barnes-Leon et al.
2004/0199536 A1 10/2004 Barnes-Leon et al.
2004/0199543 A1 10/2004 Braud et al.
2004/0249854 A1 12/2004 Barnes-Leon et al.
2004/0260534 A1 12/2004 Pak et al.
2004/0260659 A1 12/2004 Chan et al.
2004/0268299 A1 12/2004 Lei et al.
2005/0050555 A1 3/2005 Exley et al.
2005/0091098 A1 4/2005 Brodersen et al.
2008/0249972 A1 10/2008 Dillon
2009/0063415 A1 3/2009 Chatfield et al.
2009/0100342 A1 4/2009 Jakobson
2009/0177744 A1 7/2009 Marlow et al.
2010/0272105 A1* 10/2010 Li .......................... H04L 12/185 370/390
2011/0218958 A1 9/2011 Warshaysky
2011/0247051 A1 10/2011 Bulumulla
2012/0042218 A1 2/2012 Cinarkaya
2012/0233137 A1 9/2012 Jakobson et al.
2012/0290407 A1 11/2012 Hubbard et al.
2013/0212497 A1 8/2013 Zelenko et al.
2013/0218948 A1 8/2013 Jakobson
2013/0218949 A1 8/2013 Jakobson
2013/0218966 A1 8/2013 Jakobson
2013/0246627 A1* 9/2013 Taylor ................... H04L 63/104 709/227
2013/0247216 A1 9/2013 Cinarkaya
2014/0359537 A1 12/2014 Jackobson et al.
2016/0103592 A1* 4/2016 Prophete ............. G06F 3/04845 715/771
2016/0103886 A1* 4/2016 Prophete ............. G06F 16/2455 707/722
2017/0097742 A1 4/2017 Mengel, III
2017/0097956 A1 4/2017 Mengel, III
2020/0045375 A1 2/2020 Sethi
2021/0149695 A1 5/2021 Tran

OTHER PUBLICATIONS

Sauls, Office Action, U.S. Appl. No. 17/400,062, May 19, 2023, 18 pgs.

Sauls, Notice of Allowance, U.S. Appl. No. 17/400,062, Sep. 20, 2023, 8 pgs.

* cited by examiner

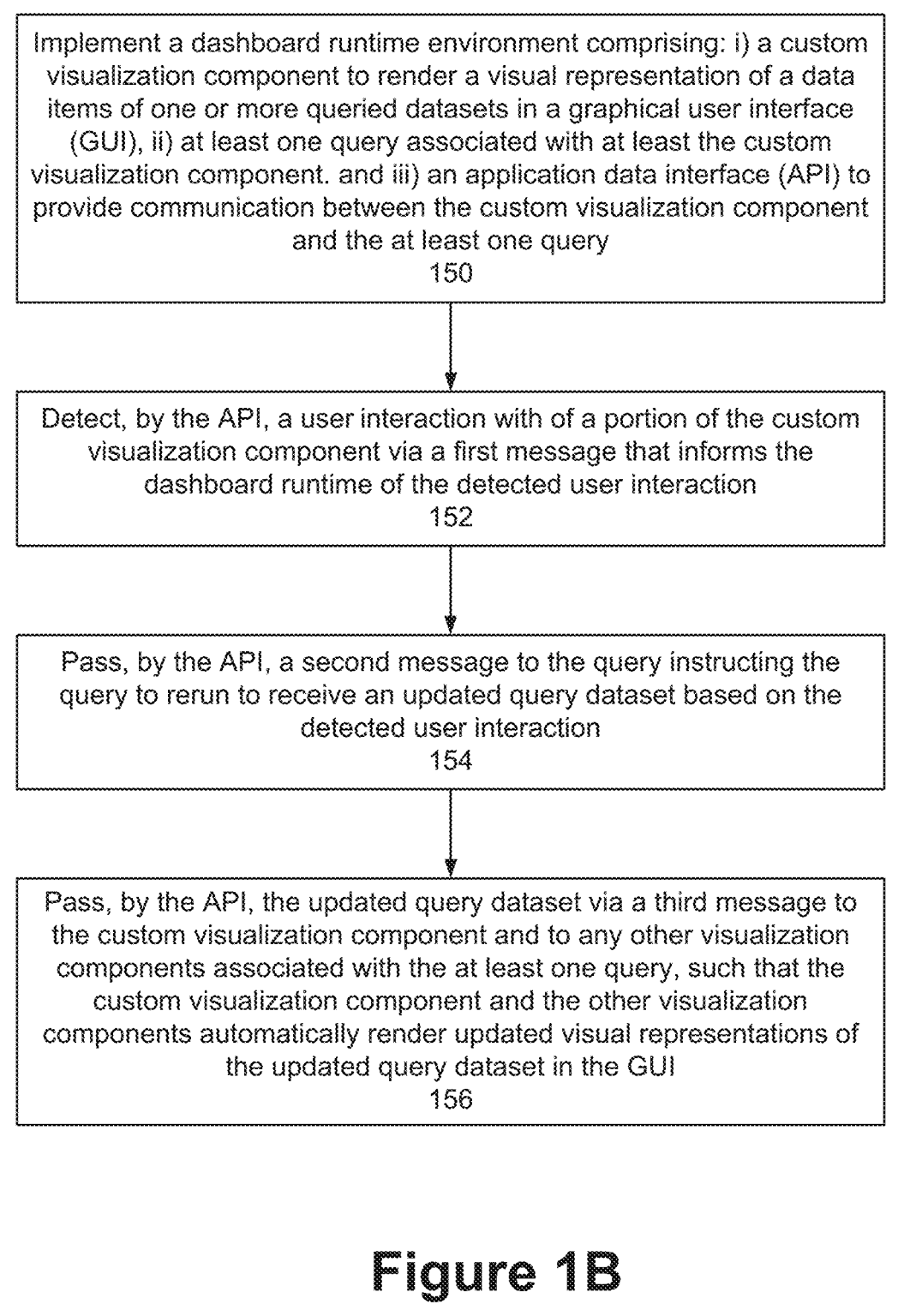

Implement a dashboard runtime environment comprising: i) a custom visualization component to render a visual representation of a data items of one or more queried datasets in a graphical user interface (GUI), ii) at least one query associated with at least the custom visualization component. and iii) an application data interface (API) to provide communication between the custom visualization component and the at least one query
150

Detect, by the API, a user interaction with of a portion of the custom visualization component via a first message that informs the dashboard runtime of the detected user interaction
152

Pass, by the API, a second message to the query instructing the query to rerun to receive an updated query dataset based on the detected user interaction
154

Pass, by the API, the updated query dataset via a third message to the custom visualization component and to any other visualization components associated with the at least one query, such that the custom visualization component and the other visualization components automatically render updated visual representations of the updated query dataset in the GUI
156

Figure 1B

VISUAL COMPONENTS IN A DATA-AGNOSTIC DASHBOARD RUNTIME ENVIRONMENT

CROSS-REFERENCE TO RELATED APPLICATIONS

This application is a continuation of U.S. patent application Ser. No. 17/400,062, filed Aug. 11, 2021, titled "Custom Components in a Data-Agnostic Dashboard Runtime Environment," which is incorporated by reference in its entirety.

This application is related to U.S. patent application Ser. No. 15/603,303, filed May 23, 2017, titled "Modular Runtime Environment," now U.S. Pat. No. 11,054,971, which is incorporated by reference in its entirety.

TECHNICAL FIELD

One or more implementations relate generally to data processing in runtime environments, and in particular to data-agnostic dashboard runtimes.

BACKGROUND

In multi-tenant database systems, tenants may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. The owner/operator of a multi-tenant database system may provide platforms or applications that generate and render visual representations of various data items, datasets, and/or relationships between various data items and/or datasets. Some of these platforms, applications, etc. may be referred to as "dashboards" and the like. Users of the multi-tenant database system (e.g., agents of a particular organization or tenant) may use a dashboard application to obtain data from an associated tenant space, and render/display visual representations of relevant tenant data.

Many dashboard applications operate in a runtime environment (RTE). One example of a dashboard runtime environment is an analytics tool or application used to visualize the activity occurring in a tenant's environment. This analytics tool offers insights into the data stored in the database system. The dashboard runtime may have a set of visualizations, or dashboard components, that are included in the product. Users may select components and pages to quickly create and reuse dynamic areas of the dashboard. However, As users expand their analytics implementations to more and more use cases, the users become increasingly constrained by the set of available visualizations included in the product. Analytic tools are also increasingly becoming used for user workflows, meaning that users start to have more use cases for combining non-analytics content, with rich interactive visualizations created in the analytic tool. A framework is needed to support creation and reuse of custom components in a dashboard runtime without having to write or modify software code.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 1B illustrates a flow diagram of a process for providing custom components in a data-agnostic dashboard runtime environment.

DETAILED DESCRIPTION

Figure 1A:
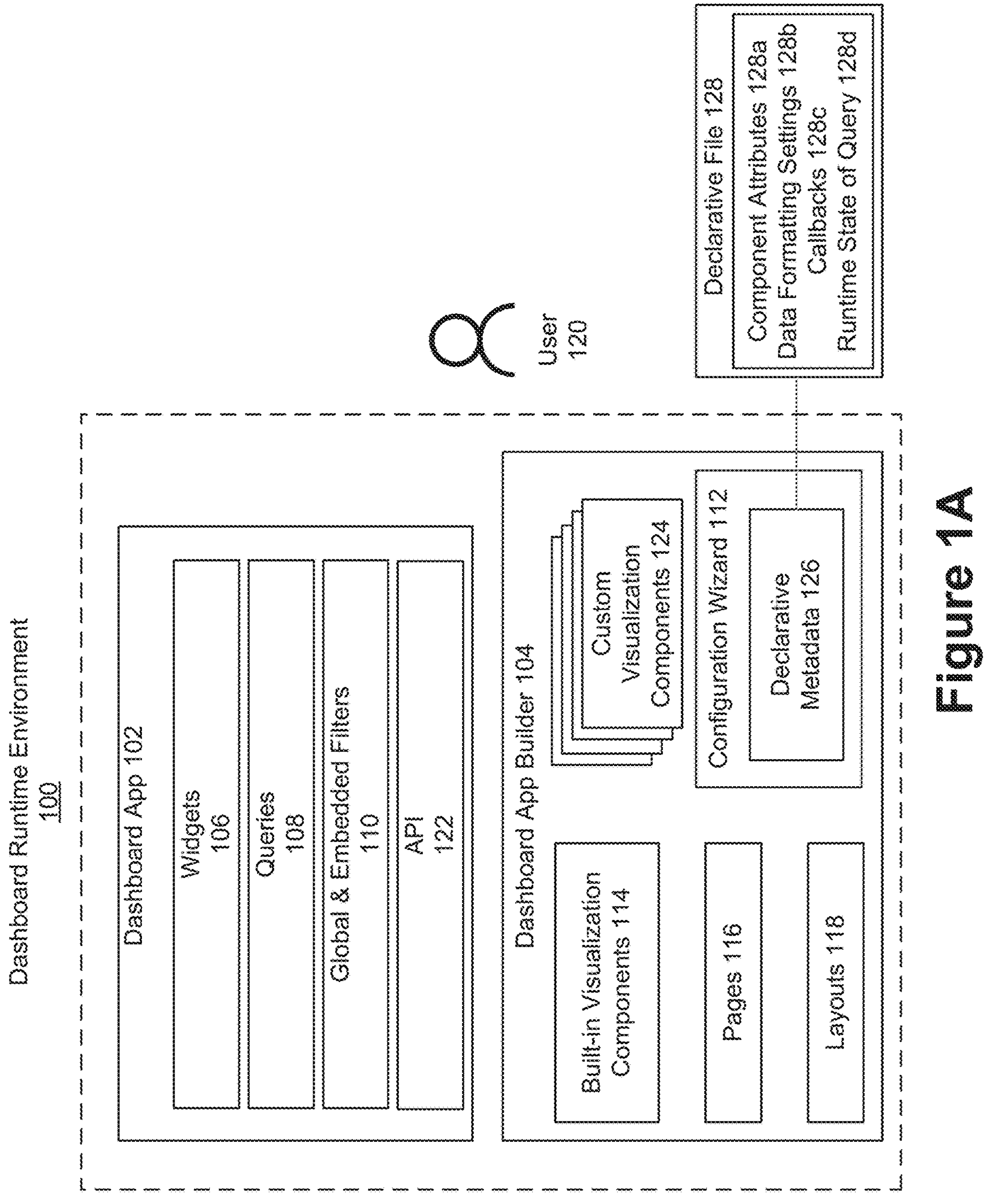
FIG. 1A is a diagram illustrating example components of a dashboard runtime environment having custom visualization components in accordance with various embodiments.

The following description describes implementations of a framework to support creation and reuse of custom components in a data-agnostic dashboard runtime environment that may include a dashboard application for generating and displaying visual representations (VRs) of data in a graphical user interface (GUI), without the need to modify software code or substantially alter the underlying logic used to render and display the VRs. In embodiments, the custom components may be created through a declarative application builder having a drag and drop interface.

The dashboard runtime environment may include a headless (e.g., capable of working without a GUI) execution engine that may communicate with different widgets within a GUI. The dashboard runtime environment separates the visual representations of the widgets from the underlying queries into distinct concepts, referred to as layers, that provide functions independent of the other layers, and also provides the ability for custom components to be associated with one or more designated queries. The association between a custom component and a query may be configured in declarative query application builder GUI. For example, the dashboard runtime environment may implement a data layer containing queries and datasets, the GUI may be implemented by a platform-specific visualization layer and an interaction layer. The dashboard runtime environment further includes an API that enables the layers to communicate. The API may be responsible for routing message to/from different layers, as well as translating or formatting the messages for consumption by the layers. In this way, individual layers may be replaced with new/different layers without requiring each remaining layer to be updated to communicate with the new/different layers. Therefore, the dashboard runtime environment may provide relatively easy abstraction since each layer is loosely coupled from one another.

The API provided by the dashboard runtime environment may also be responsible for enabling the user to associate one of the custom visualization components with a designated query. In operation, when a user clicks on a custom visualization component in the dashboard, the dashboard instructs the associated query to rerun, and the resulting data is passed not only to the custom visualization components for rendering, but also to any other visualization components associated with the query.

The custom visualization components are created and attached to the queries declaratively (rather than programmatically) by a user in an analytics query building GUI. Interactions between the dashboard's native or built-in visualizations and the custom visualization components are automatically enabled after configuring a new instance of a custom visualization component declaratively. These interactions can be further extended through additional declarative features such as data source linking or programmatic bindings.

According to the disclosed embodiment, the custom components can be built once and reused in scenarios with different data sources and completely different data schemas, and automatically inherited by other designated visualization components via the data-agnostic dashboard environment. This level of interactivity is configured declaratively, rather than programmatically as in the other tools, and is inherited automatically by the visualization components based on the associated query.

FIG. 1A is a diagram illustrating example components of a dashboard runtime environment having custom visualization components in accordance with various embodiments. The dashboard runtime environment 100 may include, implement, or run, a dashboard application (app) 102 and a dashboard application (app) builder 104. The dashboard app 102 may include widgets 106, queries 108, global and embedded filters 110. The dashboard app builder 104 enables a user 120 to create, modify or customize the dashboard app 102. The dashboard app builder 104 may include, for example, built-in visualization components 114, pages 116, and layouts 118.

The dashboard runtime environment 100 comprises hardware and software infrastructure that supports the running of a particular codebase (e.g., the widgets) in real time. For example the dashboard runtime environment 100 may comprise program code, software modules, etc., that are stored in a memory system and executed by a computer processor (e.g., processor(s) 622 of FIG. 6A). The computer processor may comprise a server operating in the cloud or be part of a user system, such as a mobile device. In embodiments, the dashboard runtime environment 100 may be executed within a software container (e.g., container 604A of FIG. 6A) or web browser of the user system. The dashboard runtime environment 100 may execute programs/scripts and may render markup language documents (e.g., HTML, Extensible Markup Language (XML), JavaScript Object Notation (JSON), etc.) and other content. The programs/scripts may be written in a client-side scripting language, such as JavaScript, Jscript, Ruby, Python, etc. Other languages, such as a proprietary scripting language, may be used as well.

In a multi-tenant environment, the widgets 106 may be used to visualize the activity occurring in a tenant's environment. Users 120 of the multi-tenant database system (e.g., agents of a particular organization or tenant) may use a dashboard app 102 to obtain data from an associated tenant space, and render/display visual representations of relevant tenant data. The data is obtained through one or more of the queries 108, which may be configured to filter the data using one or more of the global and embedded filters 110 that may be shared across multiple queries. Thus, the analytics dashboard may offer insights into the data stored in a database system. There may be many use cases for the dashboard app 102, but one example use case of the dashboard app102 is an analytics tool in which the widgets 106 display analytical visual representations of data in a GUI without having to substantially alter the underlying logic used to render/display the visual representations.

The dashboard application builder 104 may include various tools that enable a user 120 to customize the dashboard application 102 at least in part by choosing a set of widgets 106 to include in the dashboard app 102 by selecting particular ones from a set of displayed built-in visualization components 114. For example, the user 120 may select a built-in visualization component 114 via a drag and drop interface by dragging and dropping desired built-in visualization components 114 into the dashboard app 102, which results in the creation of a widget 106. The widgets 106 may be arranged within various selectable pages 116 (e.g., Web page formats) and layouts 118, where the layouts may control the layout and organization of buttons, fields, links, and the like on the pages. Selection of the pages 116, layouts 118 and built-in visualization components 114 may be implemented within the drag and drop interface.

As used herein, the built-in visualization components 114 and the widgets 106 may comprise software components that perform different functions based on user interactions therewith. Example functions may include generating and displaying visual representations (VRs) of data, generating and displaying performance indicators and filtering the data using a global and embedded filter 110, etc. In embodiments, the widgets 106 may be platform-specific, such that widgets 106 intended to nm on a desktop or laptop computer may be different from widgets 106 intended to nm on mobile devices (e.g., smart phones, tablet computers, wearable devices, smart appliances, etc.). In some embodiments, the widgets 106 intended to be nm by desktop/laptop computers may be part of a web application that is nm in a web browser, and the widgets 106 intended to be run by mobile devices may be part of a native mobile application (app) that runs in an application container or a mobile web app that runs in a mobile web browser. In various embodiments, the dashboard app 102 and the widgets 106 may be a part of a data analytics GUI, such as Salesforce® Tableau CRM dashboard, which may provide visual representations of data residing in an enterprise cloud or in an on-demand services environment (e.g., a tenant space within a database system).

The visual representations (VRs) displayed by the widgets 106 may include may be part of a "lens," which may be a particular view of data items of one or more datasets. The VRs may comprise graphs or charts, such as a line graph, bar chart, donut chart, timeline, geographic map, heat map, tabular charts (e.g., comparison tables, pivot tables, etc.), and/or other like views of data.

Although the dashboard app 102 and the dashboard app builder enable users 120 to select the built-in visualization components 114, pages 116 and layouts 118 and pages to quickly create and reuse dynamic areas of the dashboard app, implementations of the dashboard app 102 continue to expand to more and more use cases. Consequently, users 120 may become increasingly constrained by the set of available visualizations provided by the built-in visualization components 114. In addition, analytic tools are also increasingly becoming used for user workflows, meaning that users are beginning to have use cases for combining non-analytics content/data sources with rich interactive analytics visualizations generated by the widgets 106 in the dashboard app.

To expand the set of visualizations provided by the built-in visualization components 114, the disclosed embodiments provide the dashboard app 102 with an application programming interface (API) 122 that supports creation and reuse of custom visualization components 124 to create the widgets 106 in the dashboard app 102. Use of the API 122 also enables the custom visualization components 124 to be used with any specified data source, including non-analytics content/data sources.

In one aspect, the dashboard runtime environment 100 separates the visual representations provided by the widgets 106 from underlying queries 108 into distinct concepts, referred to as layers, to provide functions independent of the other layers. For example, the dashboard runtime environment 100 may implement i) a data layer containing the queries 108 and datasets, ii) a visualization layer containing the widgets 106, and iii) an interaction layer that detects user interactions with the widgets 106 during runtime (shown in FIG. 2). The API 122 may rout message to/from different layers, as well as translate or format the messages for consumption by the layers. In this way, individual layers may be replaced with new/different layers without requiring each remaining layer to be updated to communicate with the new/different layers. Therefore, the dashboard runtime environment 100 may provide relatively easy abstraction since each layer is loosely coupled from one another.

In another aspect, the custom visualization components 124 are not hard coded to any particular data source, as are the built-in visualization components 114. Rather, the dashboard app builder 104 enables users 120 to define and associate particular queries 108 with one or more of the custom visualization components 124 such that the associated query will be used as the data source for the corresponding widgets 106 without having to write or modify software code.

In operation, the dashboard app builder 104 displays the customization visualization components 124 for the user to choose from, and receives a user selection of one of the custom visualization components 124, e.g., by a point-and-click or a drag-and-drop user interface. The dashboard app builder 104 then enables the user 120 to define a query and associate the query with the selected custom visualization component to create a new widget 106 (or modify an existing one).

In one embodiment, the dashboard app builder 104 may invoke a configuration wizard 112, which allows the user 120 to configure an instance of a selected custom visualization component from the set of custom visualization components 124, and to define a query and associate the defined query with the selected custom visualization component. The configuration wizard 112 may be a pop up window or the like that enables the user 120 to define the associated query declaratively (rather than programmatically) in a GUI. As used herein, declarative programming denotes a click or drag-and-drop interface with text boxes for text entries that allows a user without coding knowledge to build widgets 106 or an entire an application.

As shown in FIG. 1A, a user may define a query by entering declarative metadata 126 that defines the query and a linked data source, as well as other parameters. The parameters defined by the declarative metadata 126 may be saved in a declarative file 128 that is stored within a database system or data repository. This makes the custom visualization components 124 more easily reusable and agnostic of the source of the data that they are visualizing. When a user interacts with a widget 106, which is a configured an instance of a custom visualization component 124, within the dashboard app 102, the dashboard app 102 may access the declarative file 128 and read the declarative metadata 126 to execute the defined and attached query to have the query dataset rendered by the widget 106. In one embodiment, the dashboard app 102 may search the declarative file 128 for the relevant record based on a query ID or a widget ID associated with the widget 106.

In one embodiment, the declarative metadata 126 may include component attributes 128*a*, data formatting settings 128*b*, and callbacks 128*c*. The component attributes 128*a* may include a definition of the query, data source linking or programmatic bindings, fields of the linked data source, and a mapping of the fields to components of the custom visualization component 124, e.g., mapping of field A of a data source to an X-axis of a graph and mapping field B of a data source to a Y-axis of the graph.

Data source linking also allows other declarative features, such as data formatting settings 128*b*. The data formatting settings 128*b* may include visualization data that may be configured at the data source and dashboard levels, and subsequently decoded and rendered by an application container and/or browser. The visualization data (VD) may include information, including the desired data items of one or more queried database objects (e.g., datasets 206 of FIG. 2), metadata about the database objects and/or datasets including columns/fields that are measures, and/or formatting information (e.g., extended metadata (XMD)). The data formatting settings 128*b* may include information that allows individual widgets 211 to consume data in a particular manner Examples of such formatting information may include display labels for dimensions and measures, grouping of measures and dimensions, color for various fields and/or regions of the visual representations, default columns to be displayed for a values table, dimensions and measures to be hidden in the GUI/widget, custom menus, mapping of org_ids with URLs, and the like. The term "dimension" may refer to any type of qualitative value (e.g., region, product name, model number, etc.), and the term "measure" may refer to any type of quantitative value (e.g., revenue, exchange rate, inventory level, etc.).

Callbacks 128*c* in the declarative metadata 126 may be settings that update selected values of the attached query, take action on a particular record in the query results, sort the visual representations of the data, or otherwise trigger a runtime event which may cause downstream changes in other visual representations of the data.

Configuring a custom visualization component 124 declaratively and adding the configured custom visualization component to the dashboard app 102 automatically enables a widget 106. In addition, interactions between the dashboard's native or built-in visualization components 114 and the custom visualization components 124 may be automatically enabled after configuring a new instance of a custom visualization component declaratively, e.g., particular if they share the same underlying query. A configured instance of custom visualization component 124 and the term widget 106 may be used interchangeably in this description.

In conventional tools, such level of interactivity must be configured programmatically and not declaratively, let alone inherited automatically based on the backing query as done in the dashboard runtime environment 100 of the disclosed embodiments. Custom visualization components 124 with an attached query can also reference the declarative metadata 126 of the attached query, allowing for declarative mapping UIs that assign particular fields of the results to certain use cases in the visualization component (e.g. X versus Y axis of a chart).

As previously described, when a user interacts with a widget 106 within the dashboard app 102, the dashboard app 102 may access the declarative file 128 and read the declarative metadata 126 to execute the attached query and have the query dataset rendered by the one or more of widget 106 to which the query is associated. Besides the component attributes 128*a*, data formatting settings 128*b*, and callbacks 128*c*, the declarative metadata 126 may further include the runtime state of the query 128*d*. The runtime state of the query 128*d* may include data and metadata from the last query execution as well as current selected values. The runtime state may be populated by components of the dashboard runtime environment 100 through the API 122 while the widget 106 is executing.

FIG. 1B illustrates a flow diagram of a process for providing custom components in a data-agnostic dashboard runtime environment. The process includes implementing a dashboard runtime environment, by a computer processor, wherein the dashboard runtime environment comprises: i) a custom visualization component to render a visual representation of a data items of one or more queried datasets in a graphical user interface (GUI) displayed on a user device; ii) at least one user-defined query associated with at least the custom visualization component; and iii) an application data interface (API) to provide communication between the custom visualization component and the at least one query (block 150).

In one embodiments, the computer processor may be part of a server of a database system that provides access to the datasets. Additionally or alternatively, the computer processor may be part of a mobile device that executes the dashboard runtime for a mobile user.

According the disclosed embodiments, during execution the API 122 includes instructions to detect a user interaction with of a portion of the custom visualization component 124 via a first message that informs the dashboard runtime of the detected user interaction (block 152). In one embodiment, detection of the user interaction by the API 122 may be implemented by program code, such as an interaction layer (described in FIG. 2), which interacts with a computer system of the user to detect user inputs into the user system and sends the first message to another API component, e.g., runtime connector (described in FIG. 2) of the dashboard runtime environment 100. Alternatively or in addition, detection of the user interaction by the API 122 may be implemented by the custom visualization component 124 transmitting the first message through the API 122 to the dashboard runtime environment 100 responsive to the user interaction to inform the dashboard runtime of the user interaction.

Referring again to FIG. 1B, after the user interaction is detected, the API 122 passes a second message to the query instructing the query to renin to receive an updated query dataset based on the detected user interaction (block 154). As used herein, a query dataset is a set of data items or objects returned from a request or query of one or more data sources such as tables or databases.

The API further passes the updated query dataset via a third message to the custom visualization component and to any other visualization components associated with the at least one query, such that the custom visualization component and the other visualization components automatically render updated visual representations of the updated query dataset in the GUI (block 156).

According to the disclosed embodiments, more than one visualization component may be associated with a single query, and when the query is run, the returned data items are used as the source of the visualizations provided by the visualization components. For example, assume that one of the built-in visualization components 114 and one of the custom visualization components 124 are associated with the same query. A user interaction with one of the two visualization components may trigger a runtime event that causes the query to rerun, which results in changes to the data displayed by both visualizations.

Figure 2:
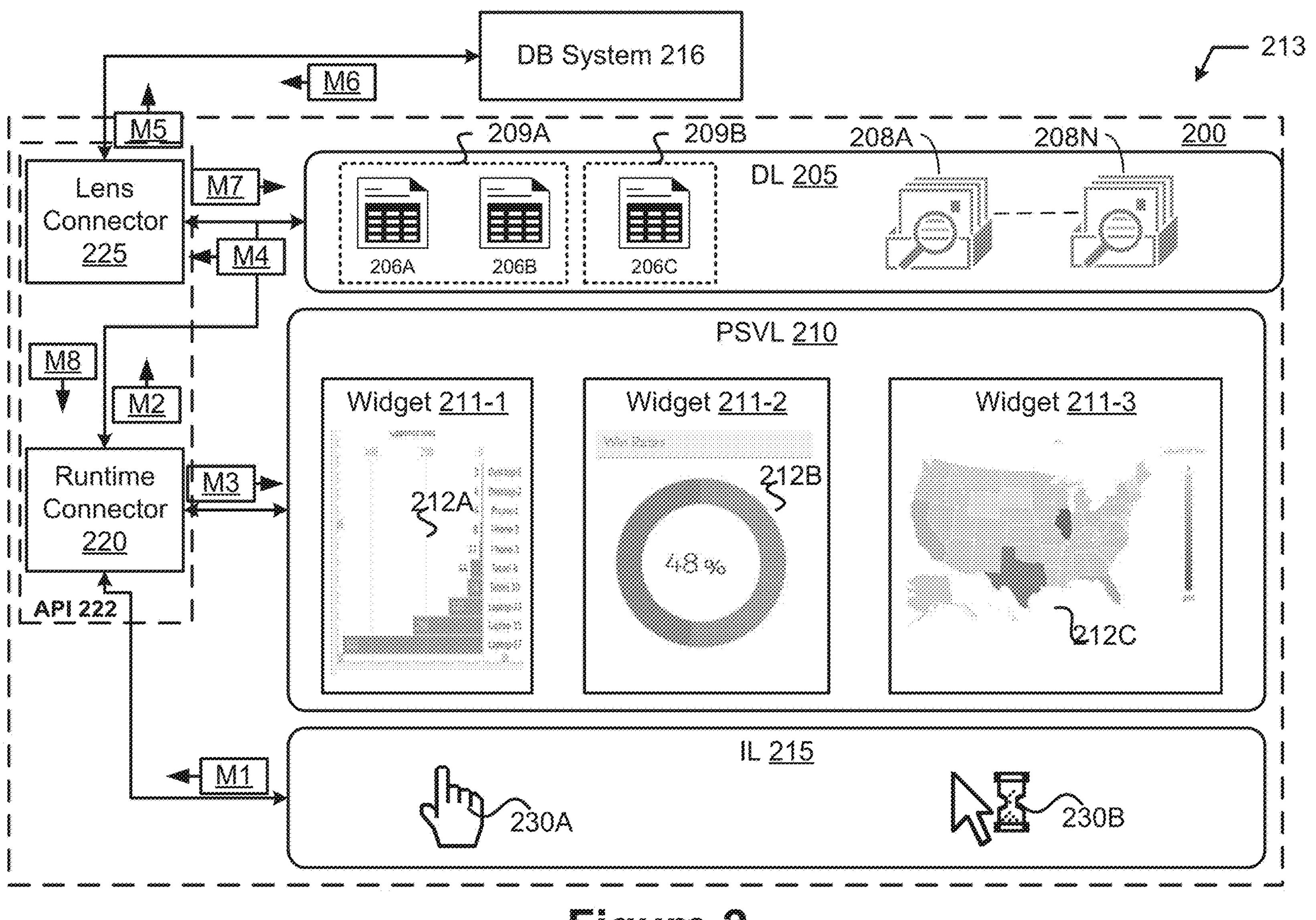
FIG. 2 illustrates a block diagram of an example where the dashboard runtime is implemented as a modulate runtime environment (MRTE) by a user system, in accordance with various example embodiments.

FIG. 2 illustrates a block diagram of an example where the dashboard runtime is implemented as a modulate runtime environment (MRTE) 200 by a user system 213, in accordance with various example embodiments. The MRTE 200 may be an implementation of an execution model that is used to access datasets 206 and render visual representations (VRs) 212 of the datasets 206 based on various interactions 230 with widgets 211. The MRTE 200 may comprise program code, software modules, etc., that are stored in a memory system and executed by a computer processor (not shown). During operation, the MRTE 200 may allow various entities within the MRTE 200 to access system resources, such as the computer processor, memory system, input system, output system, communications system, and/or other like resources. As shown, the MRTE 200 may include a data layer (DL) 205, a platform-specific visualization layer (PSVL) 210, and an interaction layer 215. Communication between the various layers is provided by API 222. In embodiments, the API 222 may include a runtime connector (RC) 220 that connects the layers and a lens connector (LC) 225 that may be communicatively connected to a database user system 216.

The IL 215 may be program code that interacts with an input system 12C of user system 213 to detect user inputs into the user system 213. In one embodiment, the ILD 215 may be implemented as part of the API 222. The IL 215 may also determine or identify an interaction type of the user input. For example, when the user system 213 is a mobile device (e.g., a smartphone, tablet computer, wearable device, etc.) the IL 215 may receive a touch indication indicative of a particular touch or gesture 230A (e.g., tap, double tap, tap-and-hold, pinch, drag, drawing of a shape, etc.) and a location of the touch/gesture 230A on a touchscreen of the input system 12C, generate a first message M1 including the touch indication, and send the first message M1 to the RC 220. In this example, the touch indication may be based on an input signal provided to an operating system of the user system 213, an application running on the system 12, another device in communication with the system 12, or any other component internal or external to the system 12. In another example, when the user system 213 is a desktop or laptop computer, the IL 215 may receive an input indication indicative of a mouse click 230B obtained from the input system 12C, generate the first message M1 to include the input indication, and send the first message M1 to the RC 225.

The indication in the first message M1 may indicate an interaction type (e.g., the particular touch/gesture 230A or the particular mouse click 230B), a location of the user interaction 230, trigger or event information, and/or other like information pertaining to the user interaction 230 with the PSVL 210. Additionally, the indication in the first message M1 may indicate a selection of a widget 211, selected data item(s) in a VR 212, desired data item(s) to be obtained based on a selection within a VR 212, a selection of a graphic control element, etc. based on the user interaction 230. The first message M1 may be passed to the RC 220, which may provide the indication to the DL 205.

The RC 220 may be a software connector that connects the various layers of the MRTE 200 to one another so that individual layers do not need to know the underlying details of the other layers. The RC 220 may facilitate message passing between the various layers and and/or components thereof. In this regard, the RC 220 may encapsulate interactions of individual layers and/or communications meant for specific layers (or components thereof). In some implementations, the RC 220 may be a type of exogenous connector, which coordinates and controls a totality of interactions/communications of the components/layers. In such implementations, the components/layers may not invoke method or procedure calls via the RC 220; rather, the RC 220 may perform the method or procedure calls on behalf of a requesting/calling layer. Additionally or alternatively, the RC 220 may be a type of middleware or "software glue," which is used to connect two or more separate components by translating or adapting instructions/commands obtained from one layer into instructions/commands that can be understood by another layer. By providing mechanisms for message passing between layers without requiring the layers to be coupled to one another, the RC 220 enables the "modularity" of the MRTE 200.

In embodiments, the RC 220 may obtain, from the IL 205, the first message M1 including the user interaction 230 indication; may extract the indication from the first message M1; and may translate or adapt the indication into an instruction or command for consumption by the PSVL 210 and/or the DL 205. As an example, if the user interaction 230 indicates to change a graph type for widget 211-1, the RC 220 may translate the indication into a command for consumption by the widget 211-1, and pass this command/instruction to the PSVL 210 in a third message M3. As another example, if the user interaction 230 indicates to zoom-in on a particular data item represented by the VR 212A of widget 211-1, the RC 220 may translate the indication into a command for consumption by the DL 205, such as a command to run the query 208 associated with the widget 211-1 with new parameters, and then pass this command/instruction to the DL 205 in a second message M2.

The DL 205 (also referred to as a "steps layer") may be program code that provides data retrieval and storage functionality for the user system 213. The DL 205 may be a formal interface for widgets 211 to consume information from various data sources in a substantially uniform manner, which may enable a data agnostic infrastructure. The DL 205 may be (or include) a headless execution engine (e.g., capable of working without a GUI) that may communicate with the PSVL 210 and IL 215 via the RC 220. In this way, the DL 205 may be the same or similar regardless of the particular platform of the user system 213, and various platform-specific GUIs (e.g., PSVLs 210) may be switched out or replaced for different user system platforms. A detailed description of some execution engine implementations is discussed in commonly assigned U.S. patent application Ser. No. 15/603,111, titled DASHBOARD EXECUTION ENGINE, by Zuye Zheng et al., filed on May 23, 2017, and hereby incorporated by reference in its entirety and for all purposes.

In embodiments, the execution engine of the DL 205 may receive commands, instructions, etc. from the RC 220. The commands/instructions may be based on the indication in the second message M2, which may be based on user interactions 230 with the VRs 212. The command/instructions in the message M2 may be a script in a first language, and the DL 205 may translate or convert the commands/instructions of the script into a second language for obtaining data. The script of message M2 may be in the form of any suitable scripting language, such as those discussed herein or a proprietary scripting language. The DL 205 (and/or the execution engine) may further provide script validation to verify that the script is valid and for security purposes. The second language for obtaining data may be, for example, a querying language or script, which may be included in a fourth message M4.

In some embodiments, the command/instructions for obtaining data (e.g., included in message M4 and/or message M8) may be based on one or more "steps." A step may include information pertaining to how data items should be represented in a widget 211. Such information may include dataset(s) 206 to query, filter conditions, groupings, etc. Some steps may provide a static list of user-defined values in response to user interactions 230, for example, by showing static values in response to selection (e.g., finger tapping or mouse button clicking) of a graphical control element (e.g., a button, slide, etc.) of a widget 211. Some steps may specify the query 208 to be executed against a data source (e.g., referred to as a "query step"). The query 208 may include various clauses, statements, expressions, criteria, conditions, filters, etc. for retrieval of one or more data values/items, records/rows, and/or fields/columns of the datasets 206 stored by the database user system 216. The type of query 208 may be based on the data source from which data items are to be obtained. For example, the execution engine may generate a first type of query to be executed against one or more datasets 206 or generate a second type of query to be executed against a database object in the database user system 216. The querying language used to generate the queries may be any suitable querying language, such as structured query language (SQL), object query language (OQL), Salesforce® OQL (SOQL), Salesforce® object search language (SOSL), Salesforce® analytics query language (SAQL), and/or other like query languages. The query 208 may be passed to the LC 225 in a fourth message M4 for transmission to the database user system 216. If the DL 205 already includes datasets 206 and/or data items required by the commands/instructions, then the DL 205 may simply provide those datasets 206/data items to other layers without querying the database user system 216.

The LC 225 may be a connector that is the same or similar as the RC 220; however, the LC 225 may provide an interface for the DL 205 (or execution engine) to query the database user system 216 for datasets 206, data items, etc. In embodiments, the LC 225 may send a fifth message M5 (also referred to as a "request message", "request M5", and the like) including the query in the fourth message M4. The request M5 may be an HTTP message where the query may be located in the header or body portion of the HTTP message. Other message types may be used to convey the request M5, such as any of the Internet protocol messages, or a proprietary protocol, where the query is located in the header or body portion of such messages. In response to the queries (e.g., included in message M5), the LC 225 may obtain a sixth message M6 (also referred to as a "response message", "response M6", and the like) including the requested datasets 206, data items, etc. The LC 225 may then pass the obtained datasets 206, desired data items, etc. to the DL 205 in a seventh message M7.

The DL 205 may receive, from the LC 225 in seventh messages M7, datasets 206 (e.g., datasets 206A-C), data items of the datasets 206, and/or other like information. The datasets 206 may be a specific set, subset, and/or transformation of data from one or more data sources (e.g., a tenant space of database 646, ELT/ETL vendor, etc.). In embodiments, the messages M7 may include information, including the data items of one or more queried database objects (e.g., datasets 206) and metadata about the database objects and/or datasets 206 including columns/fields that are measures.

The DL 205 may package or encapsulate the datasets 206, desired data items, etc. in an eighth message M8, and provide the message M8 to the PSVL 210 via the RC 220 for display. In embodiments, the DL 205 may implement publishing entities 209 (e.g., publishers 209A-B) to package/encapsulate the datasets 206, desired data items, etc. according to an associated topic, and may publish the packaged/encapsulated data to subscribing widgets 211 of the PSVL 210. In such embodiments, the publishers 209 may obtain topic-related information from the database user system 216 (e.g., as discussed previously), and may send topic-based messages (e.g., eighth message M8) to subscribers (e.g., one or more widgets 211) that subscribe to a particular topic.

In a first example, and with reference to FIG. 2, publisher 209A may be associated with topic A, which includes data items of datasets 206A and 206B. In this example, the widget 211-1 may be a subscriber of topic A, and the publisher 209A may publish data items or other like information related to topic A for consumption by the widget 211-1.

In a second example, publisher 209B may be associated with topic B, which includes data items of dataset 206C. In this example, the widget 211-2 may be a subscriber of topic B, and the publisher 209B may publish data items or other like information related to topic B for consumption by the widget 211-2. In embodiments, multiple publishers 209 may send messages M8 about a particular dataset, but each publisher may evaluate data from the dataset according to an associated topic.

In various embodiments, the DL 205 may implement one or more filters (not shown by FIG. 2), and the messages M8 may be passed through the one or more filters before and/or after the topics are evaluated prior to being sent to subscribers. These filters may be used to provide visibility for debugging, performance tracking, capture and replay of VRs 212, asserting message order for testing purposes, and/or the like. Furthermore, the subscribers and the publishing entities 209 may be defined by a tenant/organization developer and/or a system administrator/developer of the database user system 216.

The messages M8 for publication may comprise documents in a format that can be interpreted and rendered by the PSVL 210 (also referred to as "visualization data"), such as XML, JSON, and/or some other suitable data format that may be decoded and rendered by an application container and/or browser implemented by the user system 213. The visualization data (VD) may include information, including the desired data items of one or more queried database objects (e.g., datasets 206), metadata about the database objects and/or datasets 206 including columns/fields that are measures, and/or formatting information (e.g., extended metadata (XMD)). The formatting information may include information that allows individual widgets 211 to consume data in a particular manner Examples of such formatting information may include display labels for dimensions and measures, grouping of measures and dimensions, color for various fields and/or regions of the VRs 212, default columns to be displayed for a values table, dimensions and measures to be hidden in the GUI/widget, custom menus, mapping of org_ids with URLs, and the like. The term "dimension" may refer to any type of qualitative value (e.g., region, product name, model number, etc.), and the term "measure" may refer to any type of quantitative value (e.g., revenue, exchange rate, inventory level, etc.). Additionally, the VD may also include "facets" and/or "bindings," which are information/data in a programmatic language that define interactions among different components of one or more widgets 211. Although both facets and bindings may define interactions among widgets, facets and bindings are different in some respects, as discussed below with respect to FIG. 4.

In embodiments, the messages M8 may be generated by publication entities 209 to include topic-based information for generating and displaying VRs 212 (e.g., data items, fields, and/or records of datasets 206; widget/VR parameters, facets, bindings, etc.). The messages M8 may also include subscriber information, which may allow the RC 220 to route particular information to individual subscribing widgets 211. The DL 205 may send the messages M8 to the RC 220, which as discussed previously, may translate or convert the information of the M8 into a format that can be consumed by the PSVL 210 and/or the individual widgets 211, and may pass the converted/translated information to the PSVL 210 in third messages M3. In embodiments, the RC 220 may route particular messages M3 to individual widgets 211 using the subscriber information contained in the messages M8. In response to receipt of the third messages M3, the individual widgets 211 may obtain the information, and generate and display VRs 212 according to the information in the messages M3.

The PSVL 210 may be a software application designed to run on a particular platform of the user system 12. The term "platform" may refer to a specific hardware architecture, operating system, or other like setup of a computer device (e.g., the user system 213). For example, the PSVL 210 may be different when the user system 213 is a mobile device as opposed to a desktop personal computer. Depending on the platform of the user system 213, the PSVL 210 may be a native application, a web application, or a hybrid application (or variants thereof) that may be developed using platform-specific tools/programming languages, such as a software development environment (SDE), an integrated development environment (IDE), a software development kit (SDK), a software development platform (SDP), or other like platform or framework that allows tenant developers to create applications for accessing a tenant space. As an example, the platform-specific programming language may include Salesforce® Apex, Salesforce® Visualforce®, Salesforce® Lightning®, and/or other like programming languages. As another example, the platform-specific tools may include Salesforce® Wave™ Dashboard Designer, Salesforce® Force.com® IDE, and/or other like SDEs, IDEs, SDKs, SDPs, etc.

The computer processor implementing the PSVL 210 may be capable of implementing widgets 211 (e.g., widgets 211-1, 211-2, and 211-3 as shown by FIG. 2) to render graphical user interfaces (GUIs) (e.g., the VRs 212A, 212B, and 212C) in a container or a web browser of the user system 213. The widgets 211 may include VRs 212 and steps (not shown by FIG. 2). The VRs 212 (also referred to as "visualizations") may be part of a "lens," which may be a particular view of data items of one or more datasets 206. The VRs 212 may comprise graphs or charts, such as a line graph, bar chart, donut chart, timeline, geographic map, heat map, tabular charts (e.g., comparison tables, pivot tables, etc.), and/or other like views of data. For example, as shown by FIG. 2, the widget 211-1 includes a bar graph VR 212A, widget 211-2 includes a pie chart VR 212B, and widget 211-3 includes map VR 212C. The term "dashboard" may refer to a collection of lenses. Although not shown by FIG. 2, in some embodiments the widgets 211 and/or the dashboard may include one or more graphical control elements (e.g., buttons, check boxes, scroll bars, slides, etc.) that may be used to alter or adjust the lenses. As discussed previously, the steps may indicate one or more actions or calculations to be performed on both data represented by the VRs 212 and the VRs 212 themselves in response to user interactions 230 (e.g., selection of a type of graph to be displayed based on query results, changing a type of graph in response to a trigger or user input, etc.). In various embodiments, any lens may power and/or drive any widget 211, and there may be no specific compatibility rules between specific lens types and widget types. In this way, any type of step may be added to a widget 211.

In the example shown in FIG. 2, instructions/commands/information communicated between the various elements of the MRTE 200 are conveyed using messages M1-M8. It should be understood that the numerical labeling of the messages is used to differentiate the messages from one another and should not be construed as denoting order, priority, importance, etc. In various embodiments, messages M1-M8 may be in the form of any suitable language/format, such as those discussed herein and/or other like formats/languages. Additionally, although FIG. 2 shows three layers connected to one another via a single connector (e.g., RC 220), it should be noted that the layers may be combined or subdivided into other layers in a multitude of implementations, arrangements, and/or platforms.

Figure 3:
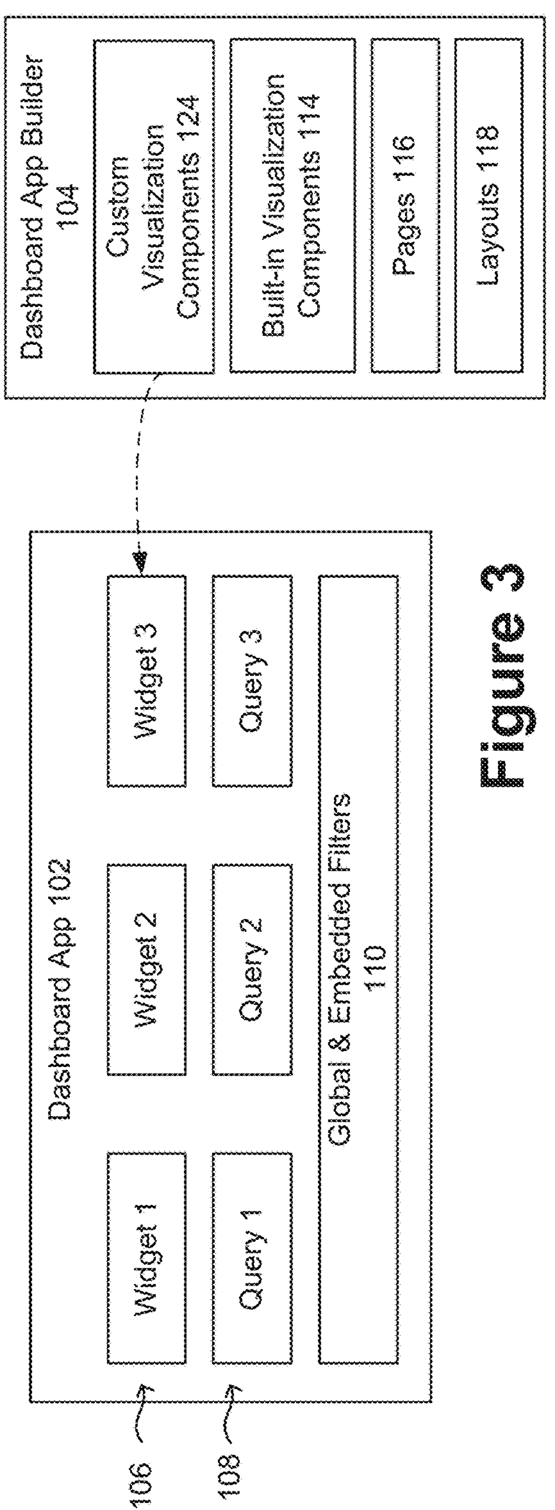
FIG. 3 is a diagram illustrating an example dashboard app and dashboard app builder in accordance with an example embodiment, where like components from FIG. 1A have like reference numerals.

FIG. 3 is a diagram illustrating an example dashboard app and dashboard app builder in accordance with an example embodiment, where like components from FIG. 1A have like reference numerals. In this example, the dashboard app 102 includes several widgets 106 and queries 108, including widget 1 associated with the query 1 and widget 2 associated with the query 2. Rather than having to write code to implement a third query, the dashboard app builder 104 enables a user to select one of the custom visualization components 124 and configure the custom visualization component 124 by optionally defining and data source linking query 3 to the custom visualization component 124. The user may also specify how query 3 interacts with data using the provided set of global and embedded filters 110, which may be shared with the other widgets 106 and queries 108. Once the custom visualization components 124 is configured and dropped into the GUI of the dashboard app 102, widget 3 is automatically created and added to the dashboard. The user may arrange the widgets 106 using the pages 116, and layouts 118 from the dashboard app builder 104.

Figure 4:
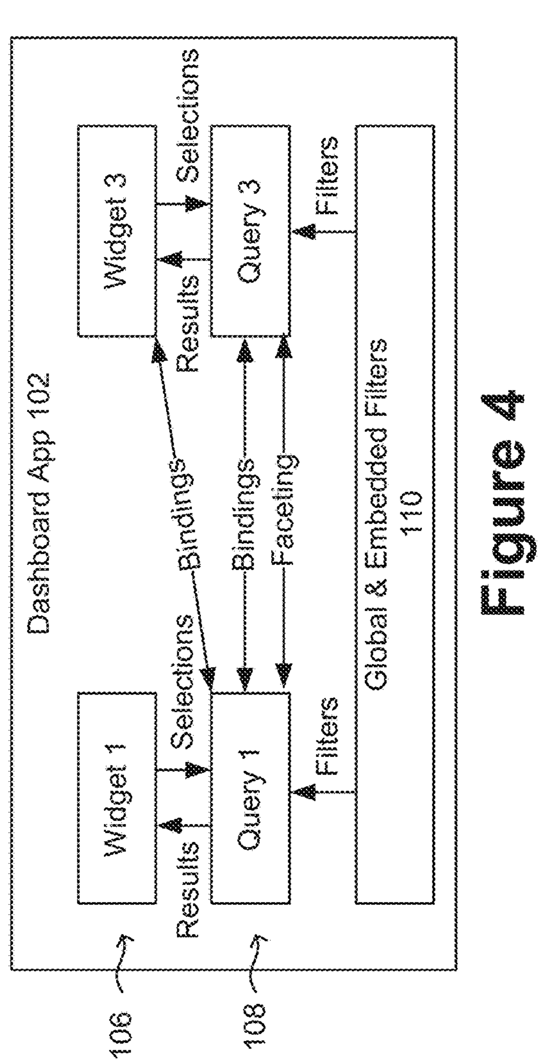
FIG. 4 is a diagram illustrating further details of the dashboard runtime communication interactions that can be enabled between widgets and queries in accordance with an example embodiment.

FIG. 4 is a diagram illustrating further details of the dashboard runtime communication interactions that can be enabled between widgets and queries in accordance with an example embodiment. In the example shown, query 1 is configured to interact with query 3 and widget 3 using the visualization data. As a user interacts with widget 1, a user selection is detected by the API 222 shown in FIG. 2, and the API 222 causes query 1 to run based on the selection. The API 222 may cause the results returned from query 1 to be filtered by the global and embedded filters 110 and then passes the filtered results to widget 1 for display as a visual representation.

Due to data source linking, the data formatting settings 128 in the declarative file 128 (FIG. 1) may include visualization data (VD) that may also include "facets" and/or "bindings," which are information/data in a programmatic language that define interactions among different components of one or more widgets 106. A facet may be a type of automatic filter. Using faceting, a user may select a filtering operation for application within a widget 1, for example, where the selection of this filtering operation automatically filters all other linked widgets 106, such as widget 3, using steps from the same or different datasets. The automatic filter may include application of the same or different filtering operations to the other widgets 106 linked to the data. The linked data may be from the same dataset or other datasets. To do this, a data layer (DL) 205 (FIG. 2) of the dashboard runtime environment 100 may identify the selected filtering operation and data to be filtered based on the user interaction, identify data linked to the selected data, and automatically inject the selected filtering operation or other filtering operations into the other steps associated with the other widgets 106. For example, a user may interact with widget 1 and select to filter data presented in a first graph showing sales within a selected country. The DL 205 may then instruct widget 3 to automatically filter a second graph displaying sales of a certain employee to display sales of for that employee within the selected country.

In some embodiments, the bindings may include a mapping of user interactions and/or data item selections to visualization parameters used for generating visual representations. The bindings may bind one or more steps to one or more other steps. The selection or results of one step may trigger updates in other steps. For example, bindings may be used to bind query 1 to query 3 and widget 3 so that a step performed in query 1 updates steps in query 3 and widget 3. In some implementations, there may be two types of bindings, selection bindings and results bindings. Selection bindings may update a step based on a selection in another step. Selection bindings may be interaction-driven such that the selection binding is evaluated each time a user selects something in a widget 106. A selection binding may specify interactions between widgets 106 that use steps from different datasets; specify filters, measures, groupings, and other aspects of a step query; and specify widget display properties (also referred to as "visualization parameters", "lens parameters", and the like) for various widget types. Widget display properties may include, for example, a selection of data or data type to display from one or more datasets; a particular graph, chart, or map in which to view the selected data; color schemes for the graphs/charts/maps; a position or orientation of the graphs/charts/maps within the widget 106, and the like.

The graphs/charts/maps to be displayed may be referred to as a "lens." A lens may be a particular view of data from one or more datasets 206. The term "dashboard" may refer to a collection of lenses (e.g., the collection of VRs 212 in the PSVL 210). In embodiments, the PSVL 210 may display lenses, dashboards, and/or control panels to alter or rearrange the lenses/dashboards.

Results binding may update a step based on the results of another step. The results bindings may be used to define intermediate results for a complex calculation. For example, to calculate the total opportunity amount for the top-five products, one step may be used to calculate the top-five products and the results of the calculation may be used to filter another step that calculates the total opportunity amount for each of the top-five products. The results bindings may also be used to dynamically change the display of a widget 106 based on the results of a step. For example, a results binding may configure a widget 106 to show different colors based on the value of a measure.

In embodiments, the facets and binding may be in a format such as XML, JSON, and/or any other format discussed herein. In some embodiments, the execution engine of the DL 205 may implement a parser generator (e.g., JISON, GNU Bison, etc.) that may parse a context free grammar or context-free language into an abstract syntax tree (AST), JavaScript code, or some other script or syntax for execution. A detailed description of some facet and binding implementations is discussed in commonly assigned U.S. patent application Ser. No. 15/603,146, titled FILTER OF DATA PRESENTATIONS VIA USER-GENERATED LINKS, by Zuye Zheng et al., filed on May 23, 2017, and hereby incorporated by reference in its entirety and for all purposes.

Figure 5:
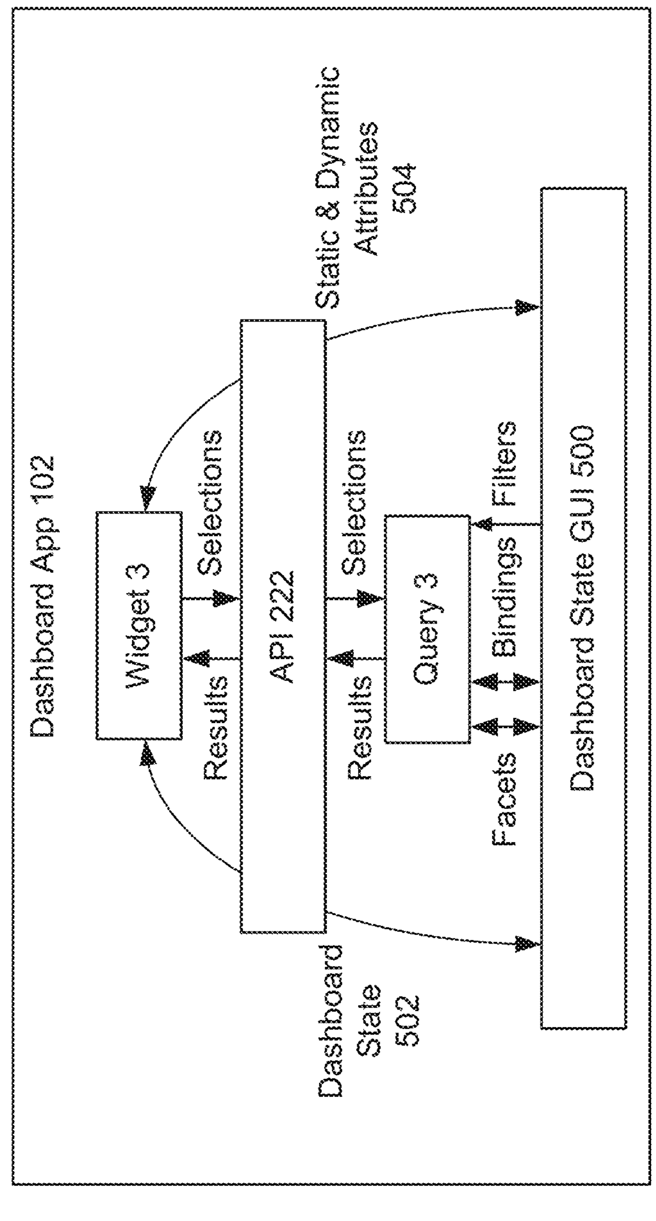
FIG. 5 is a diagram illustrating further details of functions provided by the API.

FIG. 5 is a diagram illustrating further details of functions provided by the API. As described in the previous diagrams, a primary function of the API 222 is to detect user interactions with widgets (e.g. widget 3), and if the API 222 determines that the user interaction requires updated data items from the data source associated with query 3, the API 222 passes the user interaction to query 3 for query execution. The API 222 also access the declarative file 128 and applies to the query results any facets, bindings or filters defined for query 3. The API 222 then passes the query results to widget 3 for rendering.

In accordance with a further embodiment, additionally or alternatively the API 222 may monitor and open the dashboard runtime environment 100 to the user (e.g., the creator of widget 3 and query 3 as opposed to an end-user) by displaying a dashboard state GUI 500. In embodiments, the dashboard state GUI 500 may display to the user attributes of the dashboard state 502 as well as static and dynamic attributes 504 of widget 3 and query 3. Example of the static and dynamic attributes 504 may include current user selections, applied filters (including facets and bindings) and user navigation for instance.

A dashboard runtime environment has been disclosed that separates the visual representations provided by widgets from underlying queries into distinct concepts, referred to as layers, to provide functions independent of the other layers. The dashboard runtime environment further includes a dashboard app builder that enables users to define and associate particular queries with one or more of the custom visualization components such that the associated query will be used as the data source for the corresponding widgets without having to write or modify software code. According to the disclosed embodiment, the custom visualization components can be built once and reused in scenarios with different data sources and completely different data schemas, and automatically inherited by other designated visualization components via the dashboard runtime environment. Such data source linking makes the custom visualization components more easily reusable and agnostic of the source of the data that they are visualizing. This level of interactivity is configured declaratively, rather than programmatically as in the other tools, and is inherited automatically by the visualization components based on the associated query.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
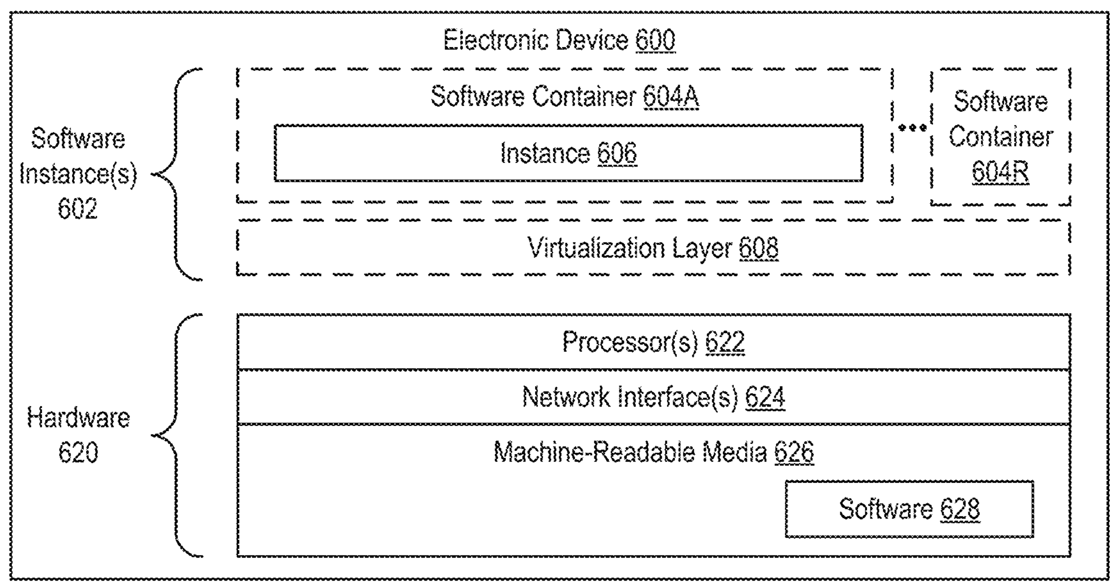
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients and the dashboard runtime environment service may be implemented in one or more electronic devices 600. In one implementation: 1) each of the clients is implemented in a separate one of the electronic devices 600 (e.g., in end user devices where the software 628 represents the software to implement clients to interface directly and/or indirectly with the dashboard runtime environment service (e.g., software 628 represents a web browser, a native client, a portal, a command-line interface, and/or an application programming interface (API) based upon protocols such as Simple Object Access Protocol (SOAP), Representational State Transfer (REST), etc.)); 2) the dashboard runtime environment service is implemented in a separate set of one or more of the electronic devices 600 (e.g., a set of one or more server devices where the software 628 represents the software to implement the dashboard runtime environment service); and 3) in operation, the electronic devices implementing the clients and the dashboard runtime environment service would be communicatively coupled (e.g., by a network) and would establish between them (or through one or more other layers and/or or other services) connections for submitting user selections and navigation information to the dashboard runtime environment service and returning visual representations to the clients. Other configurations of electronic devices may be used in other implementations (e.g., an implementation in which the client and the dashboard runtime environment service are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Example Environment

Figure 6B:
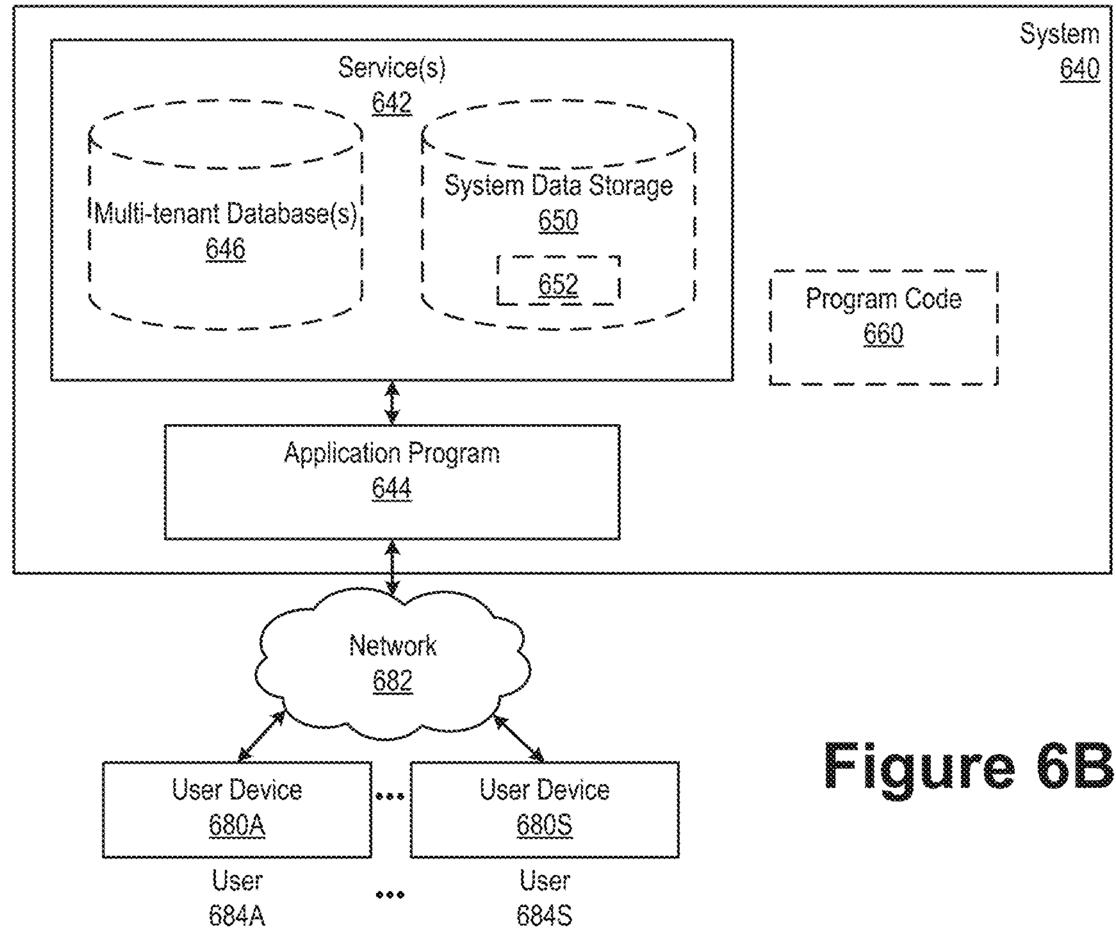
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642, including the dashboard runtime environment service. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter (s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the dashboard runtime environment service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A dashboard runtime environment for a data visualization platform, implemented on a computing device having one or more processors and memory, the dashboard runtime environment comprising:

a visualization component implemented in a visualization layer of the dashboard runtime environment and configured to render, in a graphical user interface, a visual representation of data items retrieved from a data source;

a query component implemented in a data layer of the dashboard runtime environment and associated with at least the visualization component, wherein the query component is configured to retrieve the data items from the data source; and an application programming interface (API) configured to provide communication between the visualization component and the query component during runtime, including:

receiving, at the API, notification of user interaction with the visualization component via a first message;

passing, by the API, a second message to the query component at the data layer, the second message including instructions to execute an updated query according to the user interaction;

receiving, at the API, a dataset retrieved from the data source according to execution of the updated query; and passing the dataset, by the API via a third message, to the visualization component at the visualization layer, causing the visualization component to render an updated visual representation in the graphical user interface;

wherein the API is configured to convert messages from one layer into instructions readable by another layer of the visualization layer and the data layer and to route messages between the visualization layer and the data layer.

2. The dashboard runtime environment of claim 1, wherein the visualization component is configured to render, in the graphical user interface, one or more widgets corresponding to the data items, wherein the user interaction corresponds to an interaction with the one or more widgets.

3. The dashboard runtime environment of claim 1, wherein the API is further configured to:

in accordance with a determination that a user interaction with the visualization component requires updated data items from the data source, pass a message from the visualization layer to the query component at data layer for query execution based on the user interaction.

4. The dashboard runtime environment of claim 1, wherein the API is further configured to:

access a declarative file and apply to the dataset, facets, bindings or filters defined for the query component, prior to passing the dataset, via the third message, to the visualization component.

5. The dashboard runtime environment of claim 4, wherein the facets or bindings include information in a programmatic language that defines interactions among different components of one or more widgets.

6. The dashboard runtime environment of claim 4, wherein a facet is a type of automatic filter used to select a filtering operation for application within a widget.

7. The dashboard runtime environment of claim 6, wherein the selection of the filtering operation automatically filters all other linked widgets for the widget, using steps from a same or different datasets.

8. The dashboard runtime environment of claim 7, wherein the automatic filter includes application of a same or different filtering operations to the other linked widgets.

9. The dashboard runtime environment of claim 8, wherein the data layer is configured to identify a filtering operation and data to be filtered based on the user interaction, identify data linked to the data to be filtered, and automatically inject the filtering operation or other filtering operations into other steps associated with the other linked widgets.

10. The dashboard runtime environment of claim 4, wherein the bindings include a mapping of user interactions and/or data item selections to visualization parameters used for generating visual representations.

11. The dashboard runtime environment of claim 4, wherein the bindings bind one or more steps to one or more other steps, wherein a selection or results of one step triggers updates in other steps.

12. The dashboard runtime environment of claim 4, wherein the bindings include selection bindings that update a step based on a selection in another step.

13. The dashboard runtime environment of claim 4, wherein the bindings include selection bindings that specify: (i) interactions between widgets that use steps from different datasets; (ii) filters, measures, groupings, and other aspects of a step query; and (iii) widget display properties for various widget types.

14. The dashboard runtime environment of claim 13, wherein the widget display properties include at least one of: a selection of data or data type to display from one or more datasets; a particular graph, chart, or map in which to view the selected data; color schemes for graphs, charts or maps; and a position or orientation of the graphs, charts, or maps within a widget.

15. The dashboard runtime environment of claim 4, wherein the bindings include result bindings that update a step based on results of another step.

16. The dashboard runtime environment of claim 4, wherein the bindings include result bindings that define intermediate results for a complex calculation and/or dynamically change display of a widget based on results of a step.

17. The dashboard runtime environment of claim 4, further comprising a parser generator configured to parse a context free grammar or context-free language into an abstract syntax tree (AST), JavaScript code, or a script or syntax for execution.

18. The dashboard runtime environment of claim 1, wherein the API is further configured to display a dashboard state graphical user interface for displaying one or more user attributes of a dashboard state as well as static and dynamic attributes of one or more widgets and one or more queries including current user selections, applied filters, and user navigation.

19. A method comprising:

at a computer system having one or more processors and memory storing one or more programs:

detecting a user interaction with a portion of visualization component implemented in a visualization layer of a dashboard runtime environment, wherein the visualization component is configured to render, in a graphical user interface, a visual representation of data items retrieved from a data source in response to execution of a query associated with the visualization component;

receiving, at an application programming interface (API), notification of the user interaction via a first message, wherein the API is configured to route messages between the visualization layer and a data layer and to convert messages from one layer into instructions readable by another layer of the visualization layer and the data layer;

converting, by the API, the first message into a second message with instructions executable by the data layer;

passing, by the API, the second message to a query component at the data layer, wherein the second message includes instructions that when executed send an updated query to the data source and the updated query corresponds to the query associated with the visual component that is updated according to the user interaction;

receiving, by the API via a third message, a dataset retrieved from the data source according to execution of the updated query;

converting, by the API, the third message into a fourth message with instructions executable by the visualization layer; and passing the retrieved dataset, by the API via a fourth message, to the visualization component, causing the visualization component to render an updated visual representation in the graphical user interface.

20. A non-transitory computer readable storage medium storing one or more programs, the one or more programs comprising instructions that, when executed by a computer system, cause the computer system to:

detect a user interaction with a portion of visualization component implemented in a visualization layer of a dashboard runtime environment, wherein the visualization component is configured to render, in a graphical user interface, a visual representation of data items retrieved from a data source in response to execution of a query associated with the visualization component;

receive, at an application programming interface (API), notification of the user interaction via a first message, wherein the API is configured to route messages between the visualization layer and a data layer and to convert messages from one layer into instructions readable by another layer of the visualization layer and the data layer;

convert, by the API, the first message into a second message with instructions executable by the data layer;

pass, by the API, the second message to a query component at the data layer, wherein the second message includes instructions that when executed send an updated query to the data source and the updated query corresponds to the query associated with the visual component that is updated according to the user interaction;

receive, by the API via a third message, a dataset retrieved from the data source according to execution of the updated query;

convert, by the API, the third message into a fourth message with instructions executable by the visualization layer; and pass the retrieved dataset, by the API via a fourth message, to the visualization component, causing the visualization component to render an updated visual representation in the graphical user interface.

* * * * *